Aug. 17, 1971     P. M. TOCCI     3,600,306
THIN LAYER CHROMATOGRAPHY METHOD AND APPARATUS
Filed Sept. 5, 1969
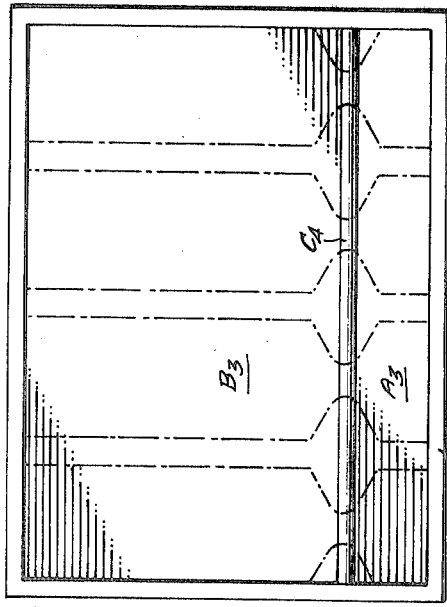
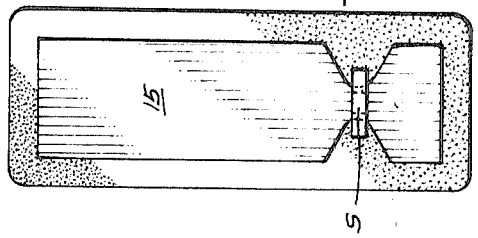
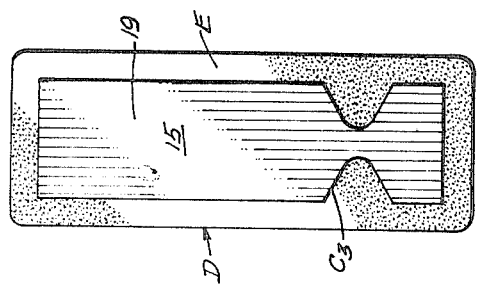
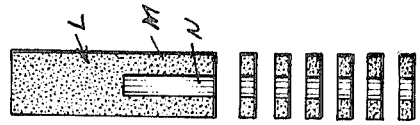
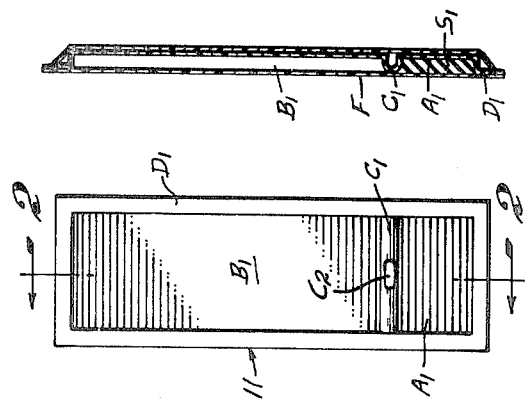
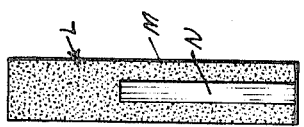
INVENTOR.
PAUL M. TOCCI
BY John Cyril Malloy
ATTORNEY.

United States Patent Office 3,600,306
Patented Aug. 17, 1971

3,600,306
THIN LAYER CHROMATOGRAPHY METHOD AND APPARATUS
Paul M. Tocci, Miami, Fla., assignor to
TLC Corporation, Miami, Fla.
Filed Sept. 5, 1969, Ser. No. 855,477
Int. Cl. B01d 15/08
U.S. Cl. 210—31
19 Claims

ABSTRACT OF THE DISCLOSURE

A disposable chromatographic unit which includes (a) a semi-solid solvent, (b) stain, (c) a chromatographic plate, and (d) a chromatography tank in one package. The semi-solid solvents are premixed together with the stain so as to be available for use at any time. The entire equipment is disposable, the structural parts being made of inexpensive plastic or metal foil which is light weight and which can be thrown away after a single use.

This application relates to a disposable chromatographic unit with semi-solid solvent, stain, chromatographic plate and chromatography tank incorporated in one package. More particularly, the present invention relates to the discovery of an apparatus and a method to be used therewith wherein the chromatographic solvents are in gel or semi-solid form such that they can be premixed and stored for many months, thus being available for use at any time. The entire unit is made of inexpensive materials and can be thrown away after a single use.

Chromatography is the separation of a mixture of closely related compounds in a sample by a solution or mixture of solutions, commonly known as the solvent, seeping through a stationary adsorbent such as silica gel or cellulose so that each compound in the sample becomes adsorbed in a separate layer. Thin layer chromatography utilizes as adsorbents cellulose or other suitable adsorbents which can be spread in thin layers on an inert solid backing such as glass, plastic film or metal foil such as aluminum. The sample is put onto the adsorbent in liquid form and allowed to dry. Then the chromatogram is developed with a suitable solvent mixture which travels through the sample, vertically ascending, descending or horizontally.

The solvents of solution-adsorption are commonly classified with respect to their polarity. Thus non-polar solvents are sorption solvents; polar solvents are elution solvents. When used in a liquid form, special tanks are needed to hold the solvents in ascending chromatography, or a more elaborate apparatus for descending chromatography, as is well known in the art. For horizontal chromatography, wicks are generally used to bring the solvent into contact with the chromatographic plate.

A form of chromatography called "thin layer chromatography" (t.l.c.) is based on the use of a thin layer of inert material as an adsorbent. This arrangement affords a great number of advantages compared with conventional column or paper chromatography. The separation of compounds on thin layer plates also depends upon the use of various mixtures of liquid solvents to move the mixtures of compounds to be separated. In general, the use of fluid solvents presents some problems of technique as well as problems of purchase, storage and mixing of the solvent mixtures which are often bulky, inflammable, noxious and volatile.

The problems of technique when liquid solvents are used are such that fairly elaborate mechanical systems are ordinarily required if one skilled in the art wishes to run a chromatogram in a descending or horizontal fashion. For example, the direction of travel of the solvent down the plate or across it necessitates a wick from the solvent container to the plate. It is also impractical to achieve a chromatogram in any moving vehicle due to unavoidable movement of the solvent in waves and subsequent deleterious effect upon the chromatogram.

The solvents are probably the greatest variable in the technique of chromatography. Commercial distribution of ready-to-use solvents for chromatography is difficult because the solvents are unstable, expensive to proportion and difficult to store. When mixed in the laboratory, batches of solvents often do not separate compounds in exactly the same way as other batches mixed in the same or other laboratories. This may be due to a number of factors such as (1) the differences in grades of reagents available from various manufacturers; (2) the variable content of water in the solvents at the time of combination; e.g. 100% ethanol used in small amounts over a period of days or weeks will pick up moisture from the air each time the bottle is opened with the result that the last portion taken from the container will have considerably more water than the first portion; (3) the altitude, temperature and humidity at the time of combination, which can change the behavior of the solvent, for example, proportions of reagents bought and mixed in New York City in the summer time may act very differently from identical reagents mixed in Denver, Colo., or Miami, Fla.

Many solvent combinations contain proportions of noxious organic solvents, strong acids or bases and other reagents not usually kept in supply in non-commercial or non-research laboratories either because of expense, lack of space or for reasons of safety. Thus the simple and ingenious analytical tool of chromatography is not used in many laboratories because of the expensive equipment and solvents and/or the lack of appropriate space to store them.

I have now discovered that most of the objections to paper chromatography or thin-layer chromatography can be overcome by the use of pre-mixed, semi-solid solvents dispensed from a closed container such as a plastic or metal tube or envelope. This method is not to be confused with so called "gel chromatography" which involves the use of gels as stationary adsorbents. In the method of my invention it is the liquid solvents which are in the form of a semi-solid or gel, whereas in "gel chromatography" the solid adsorbent, as opposed to the liquid solvents, is in the form of a gel. Thus, the gel of my invention concerns a different functional component than the gel in "gel chromatography."

According to my invention the gel will support a chromatogram upright either in the ascending or descending position by itself. The container can be transported while the chromatogram is in progress allowing a compound to be applied in the field and carried without fear of sloshing the solvent. A chromatogram can be done at zero gravity. Since the gel does not depend upon gravity to hold it in place this valuable analytical tool can be used in outer space with the same results as on earth. The gel can be placed in any relatively air-tight container such as a plastic or metal envelope, or tube or even a small jelly jar. The solvent is dispensed directly at the edge of the chromatogram so that neither the hands nor the container need ever touch the solvent. Also, only as much material as is needed is put onto the chromatogram so that there is much less waste of expensive reagents.

Because the containers are relatively air-tight and light-tight, they can be stored in a refrigerator or freezer without extensive degradation for extended time periods. The containers can be small and many can be stored in a very small area. Large batches of mixtures can be made at one time and stored. With uniform solvents available, chromatograms done at different times and in different places will be more comparable than is now possible. For laboratories that might use chromatography only infrequently this new invention may be the only practical way it can be done. For those that use chromatography more frequently, it should prove to be much less expensive and less troublesome than it is now.

In a preferred embodiment of my invention, the solvent is suspended in particles of fumed silica or fumed titania. When the proportions of fumed silica and solvent are correct the solvent is then put into dispensers which may be of the syringe type or the collapsible tube type. As a general indication of the approximate thickness, an amount of the mixed solvent is mixed with an amount of the thickening agent, such as fumed silica or fumed titania such that the beaker or other vessel in which mixing takes place can be turned upside down without the semi-solid product spilling out. The proportions of the ingredients will vary widely with the type of solvent mixtures employed. Generally, the amount of thickening agent varies from about 1% to about 15% by weight of the solvent mixture used. Acid and alkaline emulsifiers, solidifiers, thixotropic agents, gelling agents and dipersing agents may be used also to form the semi-solid or gel or to improve the characteristics of a particular solvent mixture.

In this way light and air-sensitive, volatile chemicals which are used as solvents may be stored for many months so as to be ready for instantaneous use. As is well known to those skilled in the art, prior to this invention it was customary to mix solvents just before use, or at most a day or two before use, since the components often evaporate at different rates. Thus, the composition of the solvent changed quickly with time, and soon became of little value.

According to my invention one end, hereinafter called the pickup end, of a chromatographic plate in strip form, having a sample properly applied and located, is brought into adsorptive engagement with semi-solid solvent to cause a chromatogram of the sample to develop at the opposite end portion of the strip, hereinafter called the development portion. This may be done by applying semi-solid solvent to one portion of a holder or tank, which may in a simple version comprise a glass or other solid material, and once the pickup portion of a chromatographic plate is merely pressed into the semi-solid solvent, as one puts candles on a birthday cake, the unit is activated as adsorption begins. The unit includes an air-tight container, such as a wrap of flexible, inert plastic. The chromatogram is allowed to develop within the wrap in an ascending, descending or horizontal position, either right side up or upside down. According to the usual practice, after the chromatogram is developed, the plate is stained with some suitable staining reagent which will make the desired compound visible. In my invention those staining reagents which do not react appreciably with the compounds in question until heat is applied and do not react with the solvent may be incorporated into the semi-solid solvent before packaging. In this way the additional step of staining is eliminated. After development, the chromatogram is simply heated and the desired compounds are made visible. Two such stains which may be used with my invention are Ninhydrin for amino acid detection and aniline phthalate reagent for simple sugars. The semi-solid solvent with stain incorporated therein makes the technique available to many people in an economical and convenient form and avoids the additional stain application step.

Preferably, the development takes place in the disposable chromatography tank seen in FIG. 1 and to be described presently; the tank extends the use of this valuable analytical aid. The tank is constructed of an inert, light-weight, inexpensive material such as plastic, for example, polypropylene, polyethylene and the like, or metal foil such as aluminum foil. Dimensions of length and width depend only on the size of the chromatogram desired. The important features are that it contain a recess or separate compartment for the semi-solid solvent and that it have a minimum depth of at least about $\frac{1}{16}$ of an inch. The chromatographic plate is preferably mounted on gummed paper, sized so that its dimensions correspond to those of the top surface of the chromatographic tank. When fitted over the tank, it is adapted to be held in place as by a suitable holding means, for example, by positioning it in a peripheral nest or ridge of about 1 mm. depth at the top of the disposable tank, to serve as a seal to avoid any substantial loss of the solvent from the tank.

The gel can be stored separately in a tube and added to the gel chamber of the chromatograph tank when needed. Alternately, the chamber can be packaged with the gel already in the chamber and sealed by a removable plastic film F. When needed for use, the outer film of the package is removed, the sample to be analyzed is applied and the chamber sealed by means of the sheet of gummed paper on which is mounted the chromatographic plates similar to the disposable jelly container often found in restaurants.

The sample of material to be examined by chromatography is usually applied to the chromatography plate in small increments and dried between applications. This is done to keep the diameter of the sample starting spot small since during development of the chromatogram, the compounds in the spot are subject to the forces of diffusion radially in every direction, as well as the forces of adsorptive action in the direction of the solvent movement. The task of multiple spot applications is often tedious because micropipettes are generally used. The small drops of the sample must be successively applied carefully in superimposed relation one over the other to substantially the same small area of the chromatogram after the preceding application has dried. Referring to FIG. 5, means are provided to avoid the multiple spot buildup applications. This is by means of a preferably planar type sample pickup or dip stick. The stick is a strip of adsorbent material, e.g. cellulose or silica gel on an aluminum base or backing in sheet form. The stick is dipped into a solution of the sample which is to be examined, and, then dried. The piece of the pickup sheet with the sample on it is then cut from the stick using a suitable cutter which is preferably calibrated and adjustable, or by a razor blade or scissors. The severed piece of the strip bearing the sample is placed near the neck of the chromatographic plate for development. It may be fixed in position by bending the aluminum or material of the base for mounting, as will be explained. As the solvent travels across the severed sample bearing piece from the solvent gel, it picks up the compounds from the strip by the phenomena of selective adsorption.

A fuller understanding of the invention may be had by referring to the following description and claims, taken in conjunction with the accompanying drawings.

FIG. 1 is a top plan view of a disposable chromatography tank which is used in a preferred embodiment of my invention for holding a single chromatographic plate for development of a chromatogram.

FIG. 2 is a cross-sectional view of the chromatography tank of FIG. 1, with the film F sealing the supply S, in the Chamber A.

FIG. 3 is a top plan view of a chromatographic plate which fits onto the top rim of the tank of FIG. 1, face down, to form a top seal for the tank.

FIG. 4 is a top plan view of a disposable chromatography tank which as seen in cross-section is similar to the view seen in FIG. 2. Several small or one large chromatographic plate may be placed at one time in this tank, as illustrated in phantom. The chromatographic plates are laid across the chromatography tank so that the sample is in the upper portion.

FIG. 5 is a top plan view of a dip stick for use in applying the sample to the chromatographic plate.

FIG. 6 shows the dip stick of FIG. 5 which is cut into pre-determined lengths.

FIG. 7 is a top plan view similar to FIG. 3 illustrating one of the segments as illustrated in FIG. 6 fixed in position thereon. This shows the alternate use of the dip stick segment. Instead of bending the two aluminum portions around the neck they are stuck to the adhesive paper which hold the chromatogram.

As shown in FIG. 1, the box-like container or chromatography tank is generally designated by the numeral 11 and has a separate supply compartment $A_1$ in which the solvent gel is placed, and another main development compartment or chamber $B_1$ adjacent to it, and over which the lid D comprising the chromatographic plate 15 of FIG. 3 lies during the development of the chromatogram. Preferably the top of tank has a rim $D_1$ which is adapted to mate with a corresponding rim on the lid D by adhesive means, or other suitable holding means are provided, preferably extending around the entire outer edge to hold the lid D and, consequently, the chromatographic plate in place when the development process is taking place. The divider means or septum $C_1$ lies between the supply chamber and the development chamber of $A_1$ and $B_1$ and means are provided for an adsorptive path between these chambers, as will be explained, for passage of the solvent material. A communicating passage way may be provided in the septum as at $C_2$ to facilitate travel of adsorbed solvent gel from the supply compartment into the development compartment or chamber across the confronting face of the chromatograph plate, as will be more fully described below.

The container can be made of any non-corrosive material such as plastic or metal foil. It is preferably lightweight and made of inexpensive material such as polypropylene, polyethylene, aluminum foil or the like which is adapted to be discarded after a single use. The tank may vary in shape and size, so as to be rectangular, square, oval, circular or the like. Conveniently, the tank of the preferred embodiment is rectangular and has overall dimensions in the order of about 2.75 inches by 1.25 inches, so that the top portion or mouth can receive and hold a correspondingly sized lid which includes a chromatographic plate 15 mounted on a carrier or label E. Preferably the lid components are of a size which can be easily purchased as common articles of commerce.

In the preferred embodiment, the outer periphery of the rim $D_1$ of the tank is slightly foreshortened relative to the confronting periphery of the lid D providing a marginal tab means to facilitate removal of the lid from the tank to expose the developed chromatogram for inspection.

FIG. 2 is a cross-sectional view of the chromatography tank of FIG. 1, showing the development chamber or the chromatographic plate chamber $B_1$, gel chamber $A_1$, divider $C_1$, rim $D_1$, and with a semi-solid solvent supply S, protectively covered by the film F.

FIG. 3 is a top plan view of a tank lid compound of a chromatographic plate 15 which includes the aforesaid carrier E, the plate having an adsorbent layer presented to the development chamber. The plate may be cut as at $C_3$ so as to form a neck or funnel for the solvent from the semi-solid or gel which is placed at $A_1$ to pass through the sample which is to be separated and identified. The sample is placed on the adsorbent layer of the chromatographic plate near the neck, on the portion which in assembly is in the development chamber near the confluence of the previously described passage. The chromatographic plate D is shaped with an intermediate neck area so as to direct the travel of the gel solvent and to keep the forces of diffusion to a minimum. The adsorbent material on the plate is cellulose, silica gel, alumina, starch or the like. A standard commercial product which has a 250 micron layer of cellulose on a plastic backing is suitable. Other types can similarly be used. The chromatographic plate D is mounted face up on a large carrier paper E such as a gummed label which is sized to fit over the upper portion of the tank of FIG. 1. For example, a chromatographic plate sized so as to have dimensions of 2.50 inches by 0.75 inch is cut away at $C_2$ and then centered on a gummed label having the dimensions of 2.75 inches by 1.25 inches. The sample to be identified is then applied to the chromatographic plate 15 neck area, and the plate placed face down in the tank of FIG. 1, with the pickup portion 17 in adsorptive contact with the supply S, and the development portion 19, in the development chamber.

FIG. 4 is a larger tank, seen as a rectangular box sized so as to hold several chromatographic plates side-by-side, or a single wide plate on a lid overlaying the tank chambers $A_3$ and $B_3$. The chamber $A_3$ comprises a trough between the bottom edge 21 and the septum or divider $C_4$ to form a receptacle for holding a supply of solvent gel. In this instance, several chromatographic plates may be laid side-by-side in the tank and a separate cover placed over the entire upper surface. Alternatively, several chromatographic plates can be laid side-by-side on a single gummed carrier paper which is sized to cover the top portion of the tank. The solvent gel is placed in the continuous trough $A_3$ at the base of the tank which serves all of the chromatographic plates exposed in the development chamber $B_3$. A lid or a cover is provided to fit snuggly over the top of the tank so as to avoid evaporation of the solvent during the development of the chromatogram. The lid includes one or more chromatographic plates, and carrier therefor.

FIG. 5 is a cross-sectional view of a dip stick to pick up some of the sample. It is composed of cutable material and constructed such that some of the sample will adhere to it on dipping. Preferably the dip stick is a planar strip comprising an adsorbent coating N or outer layer such as a deposit of silica gel, alumina, cellulose, starch or a similar compound. The layer is spread, preferably, 10–500 microns thick on a base M of aluminum foil or plastic film. After dipping, the stick of FIG. 5, composed of the base M, layer of adsorbent material N, and the applied sample is cut into pre-determined lengths as indicated in FIG. 6. Later, one of the segments is mounted across the neck of the chromatographic plate shown in FIG. 7 with the sample area S generally near the underlying divider means $C_4$ when in assembly. It will be apparent that the ends of a foil strip of a suitable length, somewhat longer than that shown in FIG. 7, may be folded around the edge of the lid to facilitate mounting of it across the neck.

The above-described equipment can, according to this invention, be used to separate and/or identify ingredients of numerous mixtures. The following tables give a number of examples. The preferred solidifying agent is a thixotropic substance such as fumed silica or fumed titania. Other agents, such as alumina or starch, can also be used. The thickening agent is added to the solvent in the proportion of about 1–15% of the weight of the solvent. The semi-solid gel can then be loaded into tubes, jars or syringes for dispensing or can be packed directly in the chromatography tank shown in FIG. 1 or 3.

The following examples illustrate specific applications of solvent mixtures useful in my invention:

(1) For amino acids and amines

Reagent (a): Percent by weight
n-Butanol ------------------------------ 61
Glacial acetic acid --------------------- 15
Water --------------------------------- 15
Fumed silica --------------------------- 9

To include stain in the solvent, add 0.2% by weight Ninhydrin.

To increase sensitivity, add 0.008% isatin by weight and 0.8% lutidine by weight.

Reagent (b):
Benzine ------------------------------- 60
Glacial acetic acid --------------------- 34
Water --------------------------------- 1
Fumed silica --------------------------- 6

(2) For mono-and disaccharides

Reagent (a): Percent by weight
Ethyl acetate -------------------------- 54
Pyridine ------------------------------ 22
Water --------------------------------- 18
Fumed silica --------------------------- 5.6

To include the stain, add 2% by weight aniline and 1.7% phthalic acid.

Reagent (b):
Isopropanol --------------------------- 77
Water --------------------------------- 19
Fumed silica --------------------------- 4

Use same proportions for stain inclusion.

(3) for lipids, fatty acids and cholesterol esters

Reagent (a): Percent by weight
Hexane -------------------------------- 45.0
Ether --------------------------------- 45.0
Glacial acetic acid --------------------- 0.9
Fumed titania ------------------------- 9.1

Reagent (b):
Chloroform --------------------------- 67.0
Methanol ----------------------------- 26.0
Water --------------------------------- 3.5
Fumed titania ------------------------- 3.5

(4) For alkaloids, barbiturates and amphetamines

Reagent: Percent by weight
Ethyl acetate -------------------------- 81.0
Methanol ----------------------------- 9.5
Ammonium hydroxide ------------------ 4.8
Fumed silica --------------------------- 4.7

Solvents: The fumed silica and fumed titania can be used as the thioxtropic ingredient for chromatography using solvents such as the following:

Methanol           Hydrochloric acid
Ethanol            Benzene
Propanol           Toluene
Butanol            Xylene
Ethyl acetate      Naptha
Ethylene glycol    Hexane
Glycerol           Heptane
Acetone            Carbon tetrachloride
Methyl ethyl ketone Petroleum ether
Acetic acid        Pyridine
Glycol ethers      Lutidine
Acetic acid        Water
Sulphuric acid Stains: The stains which may be included in the above solvents are listed below:

| Compounds made visible after heating the developed chromatogram | Reagent | Amount, percent by weight |
| --- | --- | --- |
| Alcohols, ethers, aldehydes, ketones and related compounds. | 2,2-diphenyl-1-picryl-hydrazyl | 0.060 |
| Polyene aldehydes | Rhodanine | 0.010 |
| Alkaloids | Chloramine-T | 0.100 |
| Choline and derivatives | Dipicrylamine | 0.400 |
| Carbohydrates | Diphenylamine | 2.000 |
| | p-Anisidine-HCl | 3.000 |
| | Aniline phthalate | 3.500 |
| | m-Phenylenediamine.2HCl | 5.000 |
| Chlorinated pesticides | o-Toluidine | 0.5 |
| | Diphenylamine-ZnCl₂ | 1.0 |
| Flavonoids | Aluminum chloride | 1.0 |
| Inorganic ions | Alizarin | 2.0 |
| | Quercetin | 2.0 |
| Organotin compounds | Pyrocatecholsulfonepthalein | 0.1 |
| Sb and Bi ions | Sodium dithionite | 0.1 |
| Alkali and Alkaline earths | Violuric acid | 1.5 |
| Lipids, phospholipids and related compounds | Crystal violet | 0.1 |
| | bromothymol blue | 0.04 |
| | morin | |
| Organic acids | D-glucosylaniline | 4.00 |
| Steirods | p-Phenylenediaminophthalic acid | 2.5 |
| Vitamin B₆ | N,2,6-trichloro-p-benzoquinoneimine | 0.1 |
| | 2,6-dichloroquinonechlorimideimine | |

Various modifications and variations of the present invention may be made without departing from the spirit of the discovery or the scope of the appended claims.

What is claimed is:

1. An apparatus for use in thin layer chromatography comprising:
   (A) a tank having
       a supply chamber for holding a semisolid solvent,
       a development chamber, and
       a closure means for closing said tank to the atmosphere during chromatographic development,
   (B) at least one integral chromatographic plate, said plate comprising a thin layer of stationary adsorbent material on a support and having:
       a solvent pick-up portion sized for receipt in the supply chamber; and
       a development portion sized for receipt in the development chamber; and
   (C) a semisolid chromatographic solvent mixture which is located in the supply chamber.
       each plate being positioned in said tank so that sample deposits to be separated and identified, when placed on the solvent pick-up portion of said plate will be moved by said solvent traveling from the supply chamber through said thin layer of stationary adsorbent material on said chromatographic plate so as to define a chromatogram on said development portion thereof.

2. Apparatus according to claim 1, wherein said closure means comprises an adhesive coated sheet of air impervious material engageable with the peripheral edges of said tank.

3. Apparatus according to claim 1, wherein said closure means is a lid constructed and arranged frictionally to engage the edges of said tank to close same to the atmosphere.

4. The apparatus of claim 1, wherein a film means is provided as a closure to seal said semisolid solvent in the supply chamber, said film means being adapted to be peeled from covering relation of said semisolid solvent to expose the same.

5. The apparatus of claim 1, wherein the chambers of said chromatography tank are adjacent and in communication whereby solvent in the semisolid material in said supply chamber can pass via the chromatographic plate into said development chamber.

6. The apparatus of claim 1, wherein said chromatographic plate comprises a layer of stationary adsorbent on a strip of inert solid backing, said adsorbent layer defining a solvent pick-up portion, a development portion and a sample deposit portion intermediate between said portions in the form of a constricted neck.

7. The apparatus of claim 6, wherein said stationary adsorptive material on said chromatographic plate is selected from the group consisting of silica gel, alumina and starch, and said coating has a thickness of about 10–500 microns.

8. The apparatus of claim 7, wherein said stationary adsorptive material comprises a silica gel adsorbent on a solid plastic support.

9. The apparatus of claim 1, wherein a plurality of plates are mounted to the face of a cover for said tank and positioned thereon so that when said cover and tank are in mating engagement the development portions of the plates confront the development chamber and the pick-up portions confront the supply chamber.

10. The apparatus of claim 1, wherein said semisolid chromatographic solvent is a gel comprising said solvent and a gelling agent.

11. The apparatus of claim 10, wherein said gelling agent comprises between 1% and 5% by weight of the amount of said semisolid chromatographic solvent mixture.

12. The apparatus of claim 10, wherein said gelling agent is selected from the group consisting of fumed silica and fumed titania.

13. A method of conducting a chromatographic analysis employing said apparatus for use in thin layer chromatography of claim 1 which comprises the steps of:

(A) adding to said supply chamber a supply of said semisolid solvent;
(B) applying to said development chamber near the pick-up portion of said plate a sample deposit to be separated;
(C) placing said plate bearing said sample deposit in spanning relation of said chambers, with the pick-up portion in adsorptive contact with said chromatographic solvent mixture; and
(D) allowing the chromatogram to develop.

14. The method as set forth in claim 13, wherein said semisolid chromatographic solvent mixture contains a heat developable staining reagent, which comprises the additional step of heating the chromatogram to develop the color of the stained sample.

15. The method as set forth in claim 13, wherein said semisolid solvent mixture is added initially to the supply chamber of said tank and then packaged in an air-tight and light-tight container for shipping prior to carrying out steps B to D.

16. In the process of claim 13, the improvement comprising applying the sample to a planar strip bearing an adsorbent coating, cutting said strip containing the sample into segments of desired length, and placing at least one of said segments in contact with said chromatographic plate near the pick-up portion of said plate.

17. The apparatus of claim 1, wherein said chromatographic plate is positioned in a peripheral ridge at the top of said tank to close the interior of said tank to the atmosphere.

18. The apparatus of claim 1, wherein said closure for said tank comprises cooperating means along the peripheries of said tank and said closure means to retain said tank in closing attitude.

19. A method of performing thin layer chromatography which comprises:

(A) applying a sample to be chromatographed to a plurality of chromatographic plates, each of said plates comprising a thin layer of stationary adsorbent material on a support and having at one end a pick-up portion, and at the opposite end a development portion;
(B) pressing said pick-up end portion of each of said plates into a supply of a semisolid chromatographic solvent mixture contained in a holder; and
(C) enveloping said plates and holder in a relatively airtight wrap while allowing a chromatogram to develop.

References Cited

UNITED STATES PATENTS

| | | | |
|---|---|---|---|
| 3,464,560 | 9/1969 | Clement et al. | 210—198 |
| 3,477,950 | 11/1969 | Clement et al. | 210—31 |

J. L. DE CESARE, Primary Examiner

U.S. Cl. X.R.

210—198